No. 758,872. PATENTED MAY 3, 1904.
G. G. STROOP.
VENDING MACHINE.
APPLICATION FILED DEC. 6, 1902.
NO MODEL. 2 SHEETS—SHEET 1.
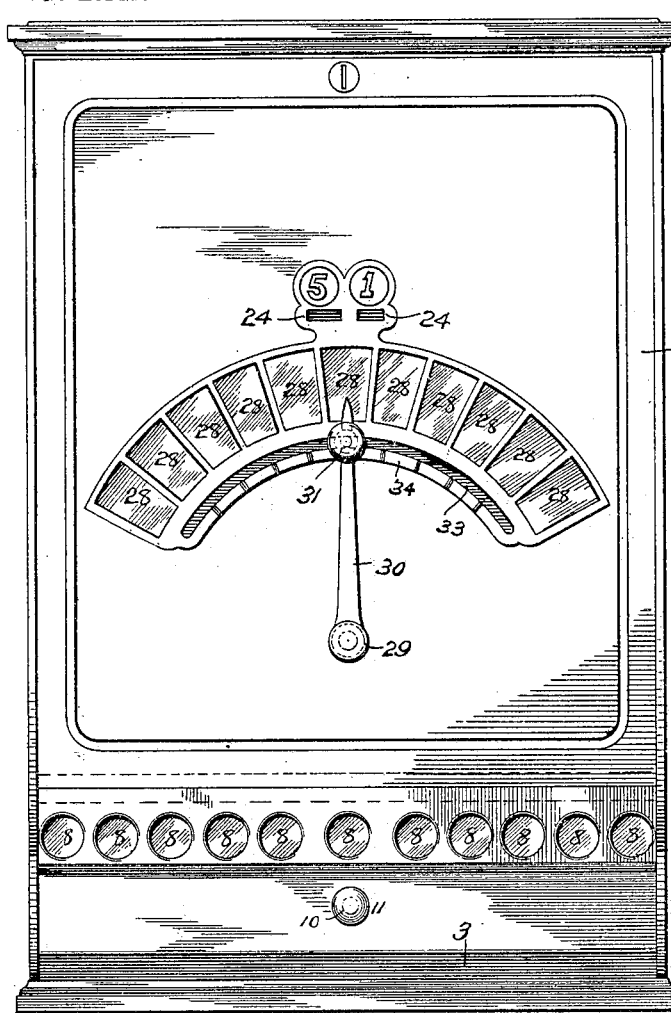
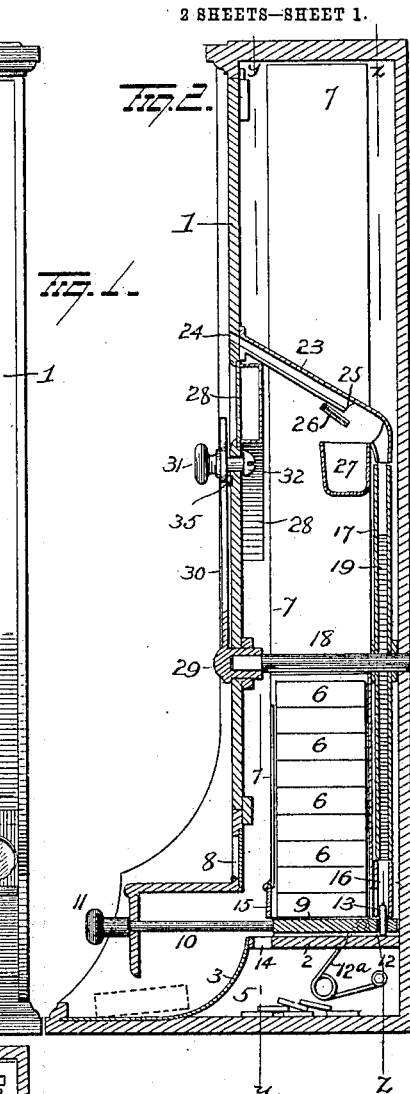
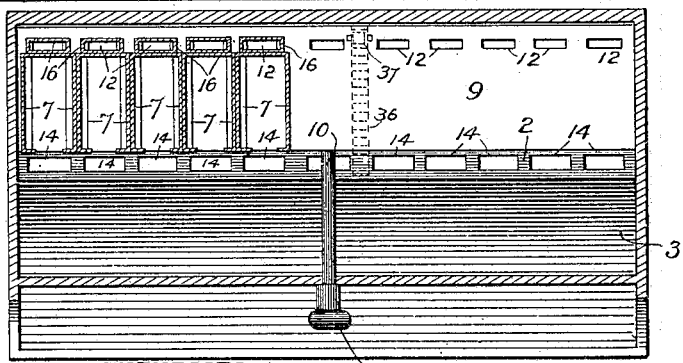
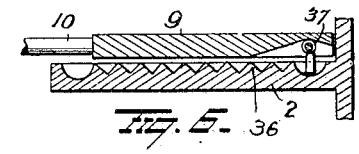
WITNESSES
INVENTOR
Geo. G. Stroop
By H. A. Seymour
Attorney

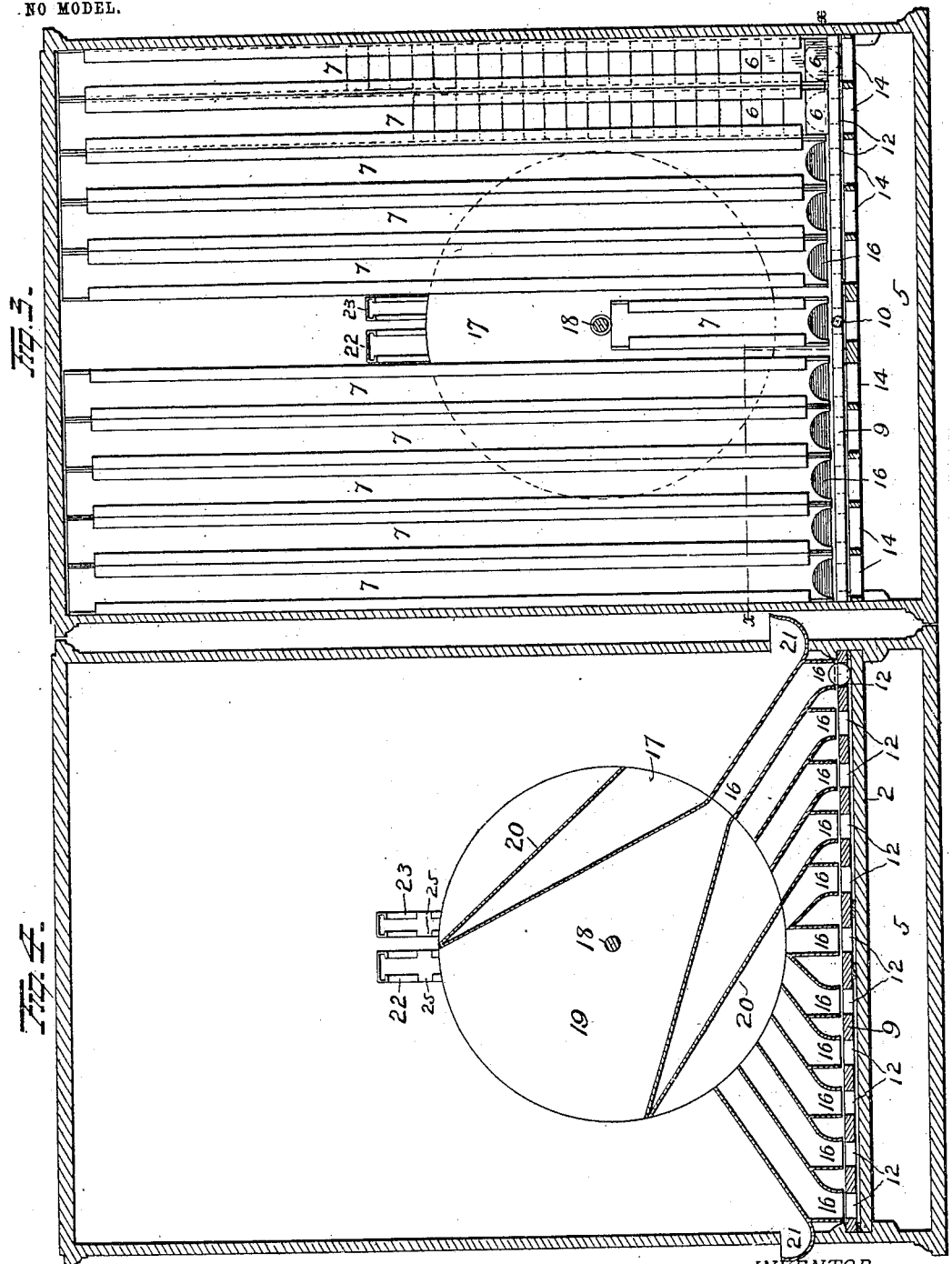

No. 758,872. Patented May 3, 1904.

UNITED STATES PATENT OFFICE.

GEORGE G. STROOP, OF CLEBURNE, TEXAS.

VENDING-MACHINE.

SPECIFICATION forming part of Letters Patent No. 758,872, dated May 3, 1904.

Application filed December 6, 1902. Serial No. 134,174. (No model.)

*To all whom it may concern:*

Be it known that I, GEORGE G. STROOP, a resident of Cleburne, in the county of Johnson and State of Texas, have invented certain new and useful Improvements in Vending-Machines; and I do hereby declare the following to be a full, clear, and exact description of the invention, such as will enable others skilled in the art to which it appertains to make and use the same.

My invention relates to an improvement in vending-machines, the object of the invention being to provide an improved vending-machine containing goods of different price and character and improved mechanism for so directing a coin as to deliver the goods of the particular character and of a price indicated.

A further object is to provide improved coin-guiding mechanism controlled by a pointer which can be moved to any of a series of display-compartments to indicate the goods desired.

With these objects in view the invention consists in certain novel features of construction and combinations and arrangements of parts, as will be more fully hereinafter described, and pointed out in the claims.

In the accompanying drawings, Figure 1 is a view in front elevation, illustrating my improvements. Fig. 2 is a view in vertical transverse section. Fig. 3 is a view in vertical longitudinal section on the line $y\ y$ of Fig. 2. Fig. 4 is a similar view on the line $z\ z$ of Fig. 2. Fig. 5 is a view in section on the line $x\ x$ of Fig. 3, and Fig. 6 is a view illustrating the ratchet mechanism of the slide-plate 9.

1 represents a casing, preferably of the general rectangular shape shown, made up in sections suitably locked together to permit ready access to the working parts of the machine. The casing is made with an internal horizontal platform 2, having an inclined plate 3 at its forward edge forming the bottom of the delivery-pocket, the casing being open at its lower front edge to permit the ready removal of goods delivered to the pocket. Beneath said platform 2 is the coin-receptacle 5, from which the coins can be removed through a suitable locked door. (Not shown.)

The packages 6, containing the goods, are held in vertical open channels 7, arranged side by side and cut away at their upper ends for the admission of the packages and also cut away at their lower ends to permit the discharge of the packages, and glass-covered openings 8 are provided in the front of the casing to permit a purchaser to determine whether or not any goods are contained in any or all of the channels. These channels 7 terminate at their lower ends just above an elongated slide-plate 9, supported on platform 2 and adapted to move thereon, and a pull-rod 10 is secured to this slide-plate 9, projects through the front of casing 1, and has a knob or handhold 11 thereon to facilitate movement of the slide, and a spring or springs $12^a$ are secured to plate 9 to normally hold the same in its inner position.

The plate 9 is provided near its rear edge behind all of the channels 7 with coin-slots 12 to receive and hold in a vertical position a coin 13, which is directed thereinto by my improved mechanism, which will be hereinafter explained. When a coin is in a slot 12, the pull-rod 10 is drawn outward to move plate 9 forward, and as the channels 7 are recessed at their backs the upwardly-projecting coin 13 will engage the lowest package 6 and force it forward until it falls into the delivery-pocket, when the coin will fall through a slot 14 in platform 2, and the plate 9 will be returned to its former position by spring or springs $12^a$ when pull-rod 10 is released. When the lowest package is ejected, the others will fall by gravity, as is readily understood, and a weighted hinged shutter 15 is provided at the front open lower end of each channel 7 to prevent the removal of goods by an instrument inserted through the delivery-pocket.

Behind each of the channels 7 and discharging into the slots 12 in slide 9 is a coin-chute 16. All of these coin-chutes extend upwardly, and the outer ones incline inwardly to the periphery of my improved coin-guide wheel 17, which latter comprises two parallel vertical circular disks secured upon a shaft 18, having bearings in casing 1. Between the disks a hopper or funnel 19 is made and is adapted to direct coins into any of the chutes 16, and deflector-plates 20 are also provided to deflect misplaced coins into open pockets 21 at the ends of the casing.

Communicating with the upper portion of the periphery of the coin-guide wheel 17 are coin-entrance chutes 22 and 23, respectively, for coins of different denomination, and for convenience of description I will call chute 22 a "five-cent" chute and chute 23 a "one-cent" chute. These chutes communicate with suitably-marked slots 24 in the front of casing 1 and incline downward as they extend rearwardly, the bottom of said chutes being formed by flanges at the sides thereof, so that should a one-cent coin be placed in the five-cent chute it will fall through the open bottom of said chute, and thus be prevented from entering hopper 19.

To prevent the use of spurious checks of iron, steel, and other like metal, I provide an opening 25 in the bottom of both chutes, over which a good coin will jump in its passage to the guide-wheel, and in proximity to these openings I locate a small permanent magnet 26, which will attract such spurious checks and overcoming their momentum draw them through the openings and compel them to fall into a receptacle 27, provided for the purpose.

In the front of casing 1 I provide a series of display-receptacles 28, arranged in the arc of a circle, shown closed by a transparent covering and suitably marked to designate the price of goods therein contained.

On the angular forward end of shaft 18, carrying guide-wheel 17, the angular socketed hub 29 of a pointer 30 is secured. This pointer is provided near its free end with a knob 31, and a headed screw 32, mounted to move in a slot 33 in casing 1, is passed through the pointer 30 and screwed into knob 31 to hold the pointer in working position. A notched bar 34 is located below this slot 33 and has its notches centered with the display-receptacles, so as to receive a lug 35 on the pointer and insure the correct position of the guide-wheel.

The slide-plate 9, as shown in Fig. 6, has pivotally secured to its lower face a pivoted double-acting pawl 37 to engage ratchet-teeth 36 on platform 2 and compel a complete movement of the slide-plate 9 in one direction before it can be moved in the reverse direction, as can be readily understood from this figure of the drawings.

The operation of my improvements is as follows: We will suppose that it is desired to purchase the five-cent goods contained only in the display-receptacle at the extreme left of the machine. The pointer 30 is turned to point to this display-receptacle, which movement of the pointer will turn coin-guide wheel 17 to the position shown in Fig. 4. When a five-cent piece is dropped into the five-cent slot, it will pass down chute 22 into hopper 19 and be directed thereby into the chute 16 at the extreme right of the machine. The coin will fall from this chute 16 into the slot 12 in slide-plate 9 and stand in an upright position behind the goods, as clearly shown in Fig. 2. Pull-rod 10 is then drawn outward, and the coin will engage the lowest package 6 and carry it forward until the remaining packages in this column fall down behind. The coin will drop through slot 14 into coin-compartment 5, and when rod 10 is released spring 12$^a$ will return the slide-plate 9 to its former position, and as the package cannot return with it it will fall down into the delivery-pocket in convenient reach of the purchaser. As the pointer 30 and guide-wheel 17 are secured upon the same shaft, they must move together, so that when the pointer is moved to point toward the goods desired the guide-wheel hopper 19 will be in a position to guide the coin into the slot 12 behind the channel containing the goods desired.

A great many changes might be made in the general form and arrangement of the parts described without departing from my invention, and hence I do not confine myself to the precise details set forth, but consider myself at liberty to make such slight changes and alterations as fairly fall within the spirit and scope of my invention.

Having fully described my invention, what I claim as new, and desire to secure by Letters Patent, is—

1. In a vending-machine, the combination with a series of channels for goods, a coin-chute behind each channel, and a slide under said channels, having slots to receive coins from said chutes, of a guide-wheel mounted to rotate on its axis and having a contracted outlet to communicate with any one of said coin-chutes, a plurality of coin-inlets arranged to communicate with said guide-wheel, and deflectors carried by said guide-wheel to prevent a coin inserted into the wrong coin-inlet from entering any of the slots in the slide.

2. In a vending-machine, the combination with a series of coin-chutes, of a rotary coin-guide wheel adapted to communicate with any one of said coin-chutes, a pocket for misplaced coins and a deflector in the guide-wheel to direct misplaced coins to said pocket.

3. In a vending-machine, the combination with a series of channels for goods of different character and price, and a coin-chute for each channel, to direct a coin into position to engage and eject the goods therein, of a rotary hopper or drum, a guide therein to aline with any of said coin-chutes, a series of coin-entrance chutes for coins of different value adapted to discharge into the larger end of the hopper to discharge the coins thereinto, and deflectors in the coin-guide for directing misplaced coins away from the chutes.

In testimony whereof I have signed this specification in the presence of two subscribing witnesses.

GEORGE G. STROOP.

Witnesses:
S. W. FOSTER,
R. S. FERGUSON.